United States Patent
Rezaiifar et al.

(10) Patent No.: US 8,583,137 B2
(45) Date of Patent: Nov. 12, 2013

(54) DYNAMIC COVERAGE ADJUSTMENT IN A MULTI-CARRIER COMMUNICATION SYSTEM

(75) Inventors: Ramin Rezaiifar, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 12/466,090

(22) Filed: May 14, 2009

(65) Prior Publication Data

US 2009/0285158 A1 Nov. 19, 2009

Related U.S. Application Data

(60) Provisional application No. 61/054,019, filed on May 16, 2008.

(51) Int. Cl.
*H04W 72/00* (2009.01)
*H04W 40/00* (2009.01)

(52) U.S. Cl.
USPC .................. 455/453; 455/446; 455/450

(58) Field of Classification Search
USPC .......... 455/447, 450, 451, 452.1, 452.2, 453, 455/446
See application file for complete search history.

(56) References Cited

U.S. PATENT DOCUMENTS

| | | | |
|---|---|---|---|
| 6,400,335 B1 * | 6/2002 | Weaver et al. | 343/853 |
| 6,650,655 B2 * | 11/2003 | Alvesalo et al. | 370/468 |
| 7,466,682 B1 * | 12/2008 | Ribas et al. | 370/342 |
| 2002/0004407 A1 * | 1/2002 | Simonsson | 455/522 |
| 2002/0193133 A1 | 12/2002 | Shibutani | |
| 2004/0264412 A1 * | 12/2004 | Arimitsu | 370/331 |
| 2005/0197147 A1 * | 9/2005 | Stephens et al. | 455/522 |
| 2005/0250502 A1 * | 11/2005 | Laroia et al. | 455/447 |
| 2006/0046735 A1 | 3/2006 | Gross et al. | |

(Continued)

FOREIGN PATENT DOCUMENTS

| | | |
|---|---|---|
| CN | 101083496 A | 12/2007 |
| EP | 1538858 A1 | 6/2005 |

(Continued)

OTHER PUBLICATIONS

International Search Report and Written Opinion—PCT/US2009/044237—ISA/EPO—Oct. 29, 2009.

(Continued)

*Primary Examiner* — Christopher M Brandt
(74) *Attorney, Agent, or Firm* — Rupit M. Patel (57) ABSTRACT

Techniques for dynamically varying coverage in a multi-carrier communication system are described. A sector may operate on multiple carriers. The sector may vary coverage on a given carrier k based on its load, so that less interference may be caused to other sectors when the sector load is light. In one design, the sector may communicate on a first carrier at a first transmit power level and on a second carrier at a second transmit power level equal to or lower than the first transmit power level. The sector may vary the second transmit power level based on its load to vary the coverage of the second carrier. The sector may reduce the second transmit power level to zero or a low level if the sector load is light. The sector may also vary the second transmit power level based on a function of sector load or a switching pattern.

34 Claims, 7 Drawing Sheets

(56) References Cited

U.S. PATENT DOCUMENTS

| | | | |
|---|---|---|---|
| 2006/0084404 A1* | 4/2006 | Laroia et al. | 455/266 |
| 2006/0105771 A1* | 5/2006 | Iacono et al. | 455/446 |
| 2006/0135169 A1* | 6/2006 | Sampath et al. | 455/447 |
| 2007/0026886 A1* | 2/2007 | Vincent | 455/522 |
| 2007/0042798 A1* | 2/2007 | Chen et al. | 455/522 |
| 2007/0053336 A1* | 3/2007 | Petrovic et al. | 370/343 |
| 2007/0070908 A1 | 3/2007 | Ghosh et al. | |
| 2007/0121547 A1 | 5/2007 | Huh et al. | |
| 2009/0082054 A1* | 3/2009 | Li et al. | 455/522 |
| 2009/0245207 A1* | 10/2009 | Rao | 370/332 |
| 2011/0051599 A1 | 3/2011 | Tanigawa et al. | |

FOREIGN PATENT DOCUMENTS

| | | |
|---|---|---|
| JP | 2002345048 | 11/2002 |
| JP | 2003037555 A | 2/2003 |
| JP | 2003069491 A | 3/2003 |
| JP | 2004503126 A | 1/2004 |
| JP | 2005117357 A | 4/2005 |
| JP | 2008067171 A | 3/2008 |
| WO | 0203566 A2 | 1/2002 |
| WO | 03041300 A1 | 5/2003 |
| WO | WO03041300 A1 | 5/2003 |
| WO | 2004025985 A1 | 3/2004 |
| WO | 2006069302 A1 | 6/2006 |
| WO | 2008055132 A2 | 5/2008 |
| WO | WO2008055132 A2 | 5/2008 |

OTHER PUBLICATIONS

Taiwan Search Report—TW098116173—TIPO—Jun. 11, 2012.
Taiwan Search Report—TW098116173—TIPO—Jan. 18, 2013.

* cited by examiner

DYNAMIC COVERAGE ADJUSTMENT IN A MULTI-CARRIER COMMUNICATION SYSTEM

The present application claims priority to provisional U.S. Application Ser. No. 61/054,019, entitled "METHOD AND APPARATUS FOR ADAPTIVE MULTI-CARRIER WIRELESS COMMUNICATIONS," filed May 16, 2008, assigned to the assignee hereof and incorporated herein by reference.

BACKGROUND

I. Field

The present disclosure relates generally to communication, and more specifically to techniques for communicating in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. The system may support operation on multiple carriers. Each carrier may be associated with a particular center frequency and a particular bandwidth. Each carrier may carry pilot and overhead information to support operation on the carrier. Each carrier may also carry data for terminals operating on the carrier. The transmissions from a base station on each carrier may cause interference to, and may also observe interference from, the transmissions from other base stations on the carrier. The interference may adversely impact the performance of all affected base stations. There is therefore a need in the art for techniques to mitigate interference in a multi-carrier communication system.

SUMMARY

Techniques for dynamically varying the coverage of a sector on one or more carriers to mitigate interference and improve performance in a multi-carrier communication system are described herein. The sector may operate on multiple carriers. The coverage of the sector on a given carrier k may be varied by adjusting the transmit power on carrier k, which may then change the amount of interference to other sectors on carrier k. The sector may vary the coverage of carrier k based on its load, so that less interference may be caused to other sectors when the sector load is light.

In one design, a base station for a sector may communicate on a first carrier at a first transmit power level, with the first carrier having a first coverage. The base station may communicate on a second carrier at a second transmit power level equal to or lower than the first transmit power level, with the second carrier having a second coverage equal to or smaller than the first coverage. The base station may vary the second transmit power level for the second carrier based on the load of the sector to vary the second coverage of the second carrier.

In one design, the base station may reduce the second transmit power level to zero or a low level if the load of the sector is light. The base station may determine that the load is light if the number of active terminals in the sector is fewer than a predetermined number of terminals for a predetermined amount of time. In another design, the base station may vary the second transmit power level based on a function of the load of the sector. The second transmit power level may be progressively lower for progressively lighter sector load. In yet another design, the base station may vary the second transmit power level between high transmit power and low transmit power based on a switching pattern. The duty cycle of the switching pattern may be determined based on the load of the sector. For all designs, when a carrier is turned off or down, terminals operating on that carrier may be moved to another carrier that is turned on.

In one design, a terminal may support operation on multiple carriers. The terminal may obtain a first signal-to-noise-and-interference ratio (SINR) for a first sector on a first carrier and may obtain a second SINR for the first sector on a second carrier. The second SINR may be different from the first SINR due to (i) the first sector varying its transmit power on the second carrier based on the load of the first sector and/or (ii) a second sector varying its transmit power on the second carrier based on the load of the second sector. The terminal may select the first and/or second carrier for communication based on the first and second SINRs. The terminal may then communicate with the first sector on the selected carrier(s).

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as cdma2000, Universal Terrestrial Radio Access (UTRA), etc. cdma2000 covers IS-2000, IS-95 and IS-856 standards. IS-2000 Releases 0 and A are commonly referred to as CDMA2000 1X, 1X, etc. IS-856 is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for HRPD.

Figure 1:
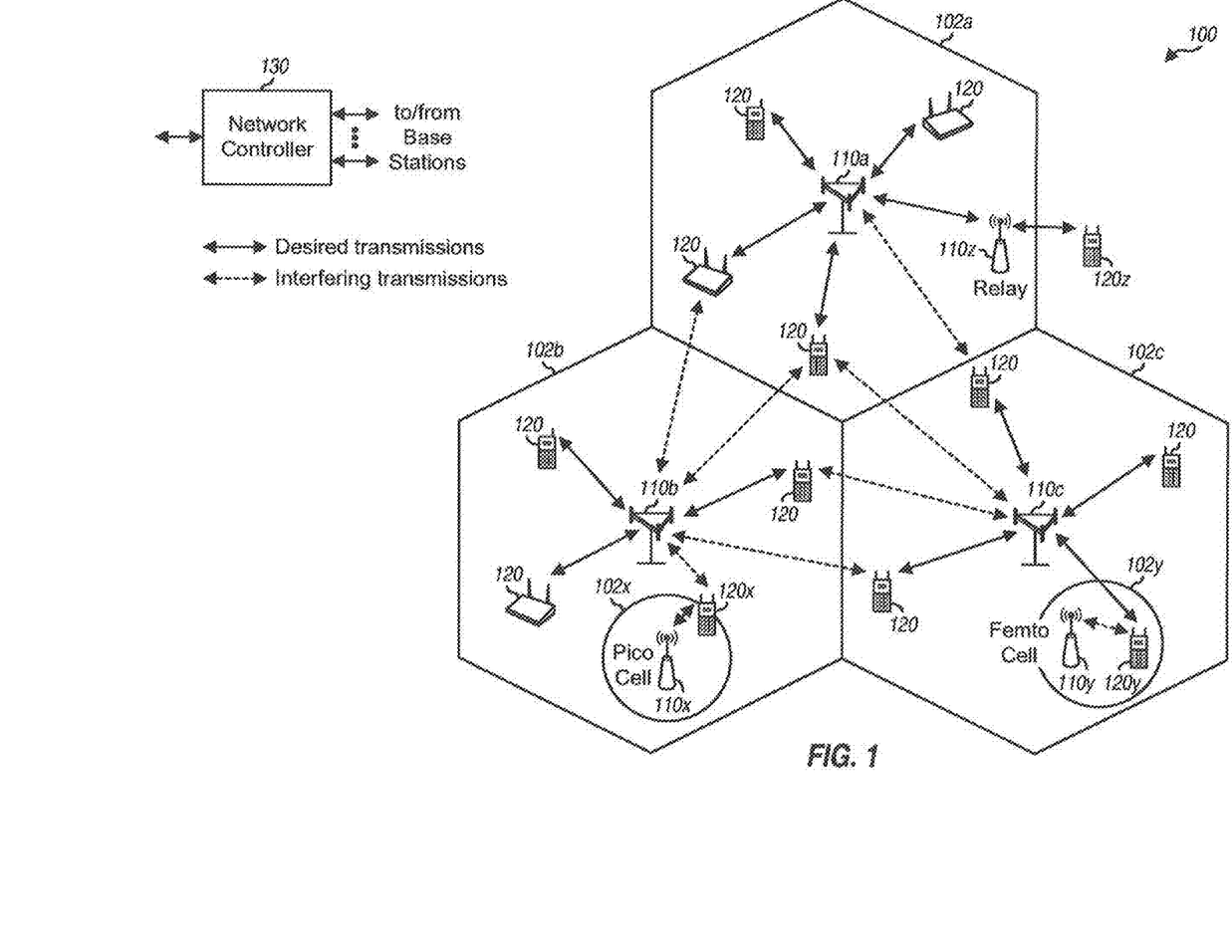
FIG. 1 shows a wireless communication system.

FIG. 1 shows a wireless communication system 100 with multiple base stations 110. A base station may be a station that communicates with the terminals and may also be referred to as an access point, a Node B, an evolved Node B (eNB), etc. Each base station 110 may provide communication coverage for a particular geographic area. To improve system capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area. In 3GPP2, the term "sector" or "cell-sector" can refer to the smallest coverage area of a base station and/or a base station subsystem serving this coverage area. For clarity, 3GPP2 concept of "sector" is used in the description below. A base station may support one or multiple (e.g., three) sectors.

System 100 may include only macro base stations or base stations of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home). System 100 may also include relay stations, e.g., relay station 110z. The techniques described herein may be used for all types of base stations.

A network controller 130 may couple to a set of base stations and provide coordination and control for the base stations. Network controller 130 may communicate with the base stations via a backhaul. The base stations may also communicate with one another, e.g., via wireless or wireline backhaul.

Terminals 120 may be dispersed throughout system 100, and each terminal may be stationary or mobile. A terminal may also be referred to as a mobile station, a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the forward and reverse links. The forward link (or downlink) refers to the communication link from the base station to the terminal, and the reverse link (or uplink) refers to the communication link from the terminal to the base station. In FIG. 1, a solid line with double arrows indicates desired transmissions between a terminal and a serving sector. A dashed line with double arrows indicates interfering transmissions between a terminal and a non-serving sector.

System 100 may support operation on multiple carriers. A multi-carrier transmitter can transmit one or multiple modulated signals simultaneously on the multiple carriers. Each modulated signal may be a CDMA signal, a TDMA signal, an OFDMA signal, a SC-FDMA signal, etc. In general, each modulated signal may be dependent on the modulation technique used to generate the modulated signal. Each modulated signal may be sent on a different carrier and may carry pilot, overhead information, data, etc. Pilot is a transmission that is known a priori by a transmitter and a receiver and may also be referred to as a reference signal, a preamble, etc.

Figure 2:
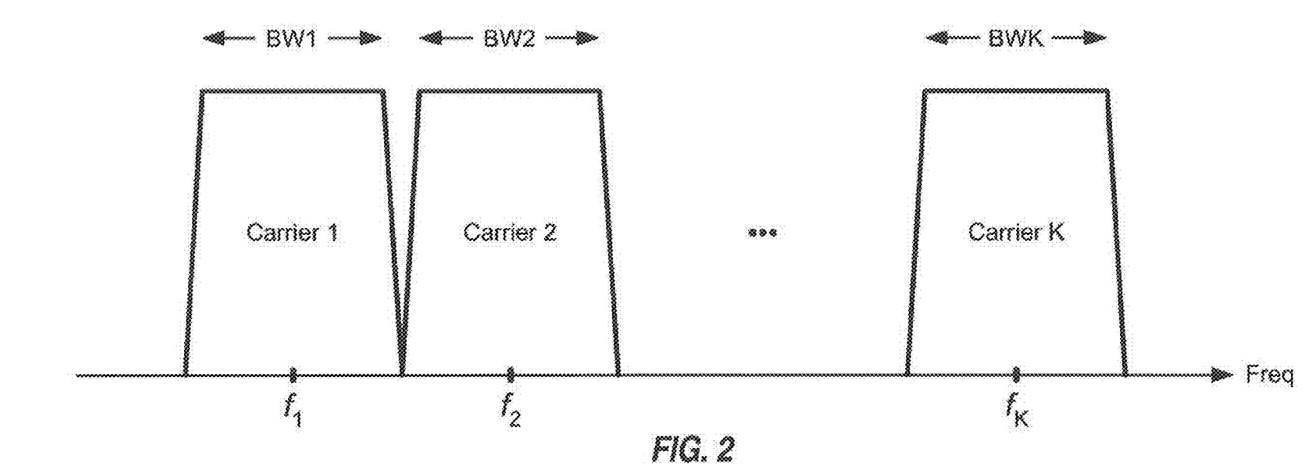
FIG. 2 shows an exemplary transmission on multiple carriers.

FIG. 2 shows an exemplary transmission of K modulated signals on K carriers, where K>1 for multi-carrier operation. In this example, carrier 1 has a center frequency of $f_1$ and a bandwidth of BW1, carrier 2 has a center frequency of $f_2$ and a bandwidth of BW2, etc., and carrier K has a center frequency of $f_K$ and a bandwidth of BWK. The center frequencies are typically selected such that the carriers are spaced sufficiently far apart to reduce inter-carrier interference. The K carriers may have the same bandwidth, e.g., 1.2288 MHz for cdma2000, 3.84 MHz for WCDMA, or 20 MHz for IEEE 802.11. The K carriers may also have different bandwidths, which may be configurable.

K modulated signals may be transmitted on the K carriers. Each modulated signal may be transmitted at up to a maximum transmit power level allowable for a transmitter. The maximum transmit power level may be dependent on whether the transmitter is a base station or a terminal, the base station type (e.g., macro, pico, or femto), etc.

System 100 may employ a frequency reuse of one. In this case, each base station can transmit at the maximum transmit power level on all K carriers for each sector served by that base station. This may improve system capacity since each carrier can be used by each sector in the system. However, the transmissions from a given sector X on a given carrier k may act as interference to the transmissions from other sectors on carrier k. The other sectors may need to send their transmissions at a lower data rate on carrier k in order to ensure reliable reception of their transmissions in the presence of interference from sector X. The transmissions from sector X may thus increase the capacity of sector X at the expense of the capacities of the other sectors.

In an aspect, the coverage of a sector on one or more carriers may be dynamically varied to improve system performance. The sector may operate on multiple carriers. The sector may vary the coverage of a given carrier k by adjusting the transmit power on carrier k, which may then change the amount of interference to other sectors on carrier k. The sector may vary the coverage of carrier k based on its load, so that less interference may be caused to other sectors when the sector load is light. The sector may thus reduce its capacity (as well as its interference) when not needed in order to possibly improve the capacity of other sectors.

The coverage of a sector on a given carrier may be defined or characterized by a spatial distribution of received signal quality for the carrier. Received signal quality may be quantified by a signal-to-noise-and-interference ratio (SINR), a signal-to-noise ratio (SNR), an energy-per-chip-to-total-received-power ratio (Ec/Io), a carrier-to-total-interference ratio (C/I), etc. For clarity, SINR is used for received signal quality in much of the description below. The coverage of a sector on a given carrier may then be characterized by a spatial SINR distribution. For example, the coverage may be given by the geographic areas in which the SINR exceeds a particular SINR threshold with a certain probability. Since SINR is related to data rate or throughput, the SINR threshold may correspond to a certain minimum data rate, which may be defined to obtain satisfactory performance.

Figure 3:
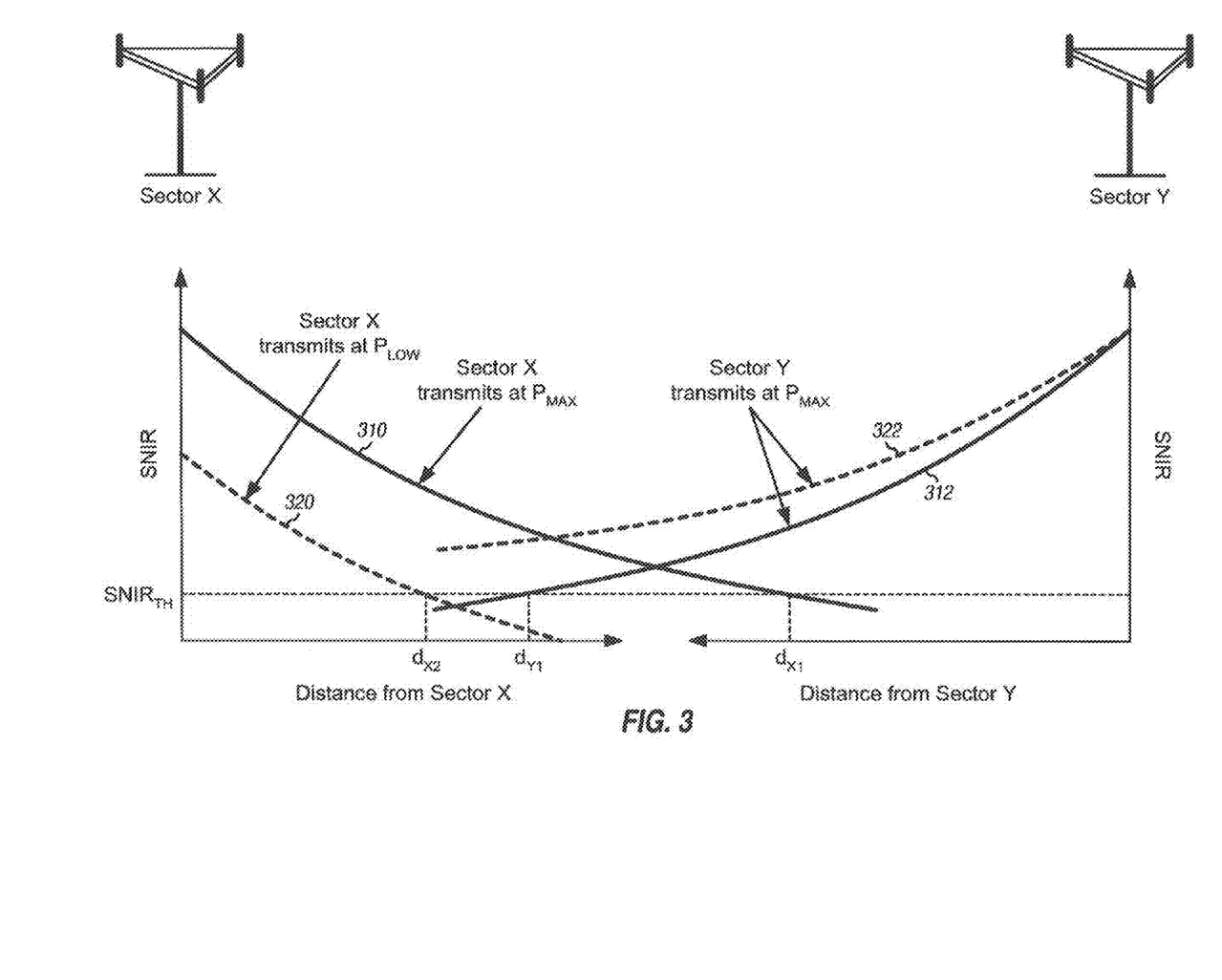
FIG. 3 shows plots of SINR versus transmit power on a carrier for two sectors.

FIG. 3 shows exemplary plots of SINR versus transmit power on a given carrier k for two sectors X and Y served by two base stations. The SINR achieved by a given terminal is determined by (i) the received power of a desired transmission from a serving sector and (ii) the total interference from other sectors and noise. The received power of a sector is determined by the transmit power used by the sector and the pathloss from the sector to the terminal. The pathloss may increase by $d^3$ to $d^5$, where d is the distance from the sector to the terminal. The pathloss may be subject to random variations due to man-made and/or natural obstructions in the propagation path.

Plots 310 and 312 show SINR achieved by terminals on carrier k with sectors X and Y both transmitting at the maximum power level of $P_{MAX}$ on carrier k. Plot 310 shows the SINR for terminals served by sector X as a function of distance to sector X. The SINR decreases for larger distance away from sector X due to (i) larger pathloss, which results in lower received power for serving sector X, and (ii) higher interference from non-serving sector Y. Similarly, plot 312 shows the SINR for terminals served by sector Y as a function of distance to sector Y. The SINR decreases for larger distance away from sector Y. The coverage of each sector may be given by the geographic area in which the SINR exceeds the SINR threshold, $SINR_{TH}$. In the example shown in FIG. 3, the coverage of sector X may be up to a distance of $d_{X1}$ from sector X, and the coverage of sector Y may be up to a distance of $d_{Y1}$ from sector Y.

Plots 320 and 322 show SINR achieved by terminals on carrier k with sector X transmitting at a low power level of $P_{LOW}$ and sector Y transmitting at the maximum power level of $P_{MAX}$ on carrier k. Plot 320 shows the SINR for terminals served by sector X as a function of distance to sector X. Similarly, plot 322 shows the SINR for terminals served by sector Y as a function of distance to sector Y.

As shown by plots 310 and 320, the SINR distribution and the coverage of sector X may be reduced by lowering the transmit power of sector X on carrier k. In the example shown in FIG. 3, the coverage of sector X may reduce from $d_{X1}$ to $d_{X2}$ due to the use of a lower transmit power level on carrier k. The lower transmit power level may reduce interference to sector Y. Sector X may still be able to serve some terminals located closer to sector X. For a given terminal served by sector X, the SINR and the supported data rate decrease when lower transmit power is used by sector X on carrier k.

As shown by plots 312 and 322, the SINR distribution and the coverage of sector Y may improve due to sector X reducing its transmit power on carrier k. In the example shown in FIG. 3, the coverage of sector Y may increase past $d_{Y1}$ due to the use of a lower transmit power level by sector X on carrier k. The improved coverage may be especially beneficial for terminals located near the coverage edge of sector Y. The sector-edge terminals served by sector Y may achieve higher SINR and may support higher data rate. For example, a sector-edge terminal may have equal received power for sectors X and Y when both are transmitting at $P_{MAX}$ and may achieve 0 dB SINR. This terminal may be able to achieve a higher SINR (and possibly a much higher SINR) with lower (or possibly zero) received power for sector X due to sector X using lower (or no) transmit power on carrier k.

For simplicity, FIG. 3 shows the coverage and SINR distribution of only two sectors X and Y, with sector X transmitting at different power levels on carrier k. In general, the coverage and SINR distribution may be determined for any number of sectors. The coverage and SINR distribution of a given sector may be dependent on the interference from other sectors, which may in turn be dependent on the transmit power used by these other sectors.

The coverage of a given sector X on a given carrier k may be dynamically varied in various manners. In a first design of dynamic coverage adjustment, carrier k may be shut down or turned off, its transmit power may be reduced to zero, and its coverage may also be reduced to zero when the load of sector X is light. A sector typically transmits pilot and overhead information on a carrier, even when there is no data to transmit, in order to support operation on the carrier. The overhead information may include system information conveying various system parameters, broadcast information intended for all terminals, control information to support data transmission, etc. Sector X may avoid transmitting pilot, overhead information, and data on carrier k when this carrier is shut down. This would result in sector X causing no interference to other sectors on carrier k.

Light sector load may be quantified in various manners. In one design, sector X may be deemed to have a light load if there are few active terminals for a predetermined amount of time. For HRPD, an active terminal may be a terminal that points to sector X and has a non-empty queue at sector X. An active terminal may be defined in other manners for other systems. The number of active terminals in sector X may be denoted as N. The sector load may be deemed as (i) light if N is less than a low threshold for T minutes or (ii) not light if N is greater than a high threshold. T may be any suitable value and may be sufficiently long to avoid rapid switching of carrier k between on and off. The high and low thresholds may also be any suitable values, may or may not be equal, and may be selected to obtain satisfactory performance.

In another design, sector load may be determined based on historical knowledge of the load of the sector. Load may also be determined based on time of day, date of week, etc. For example, sector X may cover a portion of a freeway, and the sector load may be heavy during commuting hours and light during non-commuting hours. As another example, sector X may cover a residential area, and the sector load may be heavy during evening hours and light during daytime hours.

In yet another design, sector load may be determined based on the number of active sector-edge terminals. If most or all of the active terminals are located close to sector X, then the sector load may be deemed to be light, and the transmit power on carrier k may be reduced. How close a terminal is to sector X may be determined based on pilot strength reported by the terminal. The report may be generated autonomously by the terminal or in response to a request from the system. If a sufficient number of active terminals are located at the coverage edge of sector X, then sector load may be deemed to be not light, and sector X may transmit at $P_{MAX}$ on carrier k. Sector load may also be determined in other manners.

Sector X may turn off carrier k when its load is light and may turn on carrier k when its load is not light. For a system with a nominal frequency reuse of one, turning off carrier k effectively changes the frequency reuse to greater than one. This may then improve the coverage and SINR distribution of other sectors on carrier k.

Turning off carrier k under light sector load may improve system performance over keeping carrier k idle. As noted above, sector X may transmit pilot and overhead information on idle carrier k even when there is no data to transmit on carrier k. The pilot and overhead information may cause interference to other sectors on carrier k. The amount of interference and its impact may be dependent on how the pilot and overhead information are transmitted.

Figure 4:
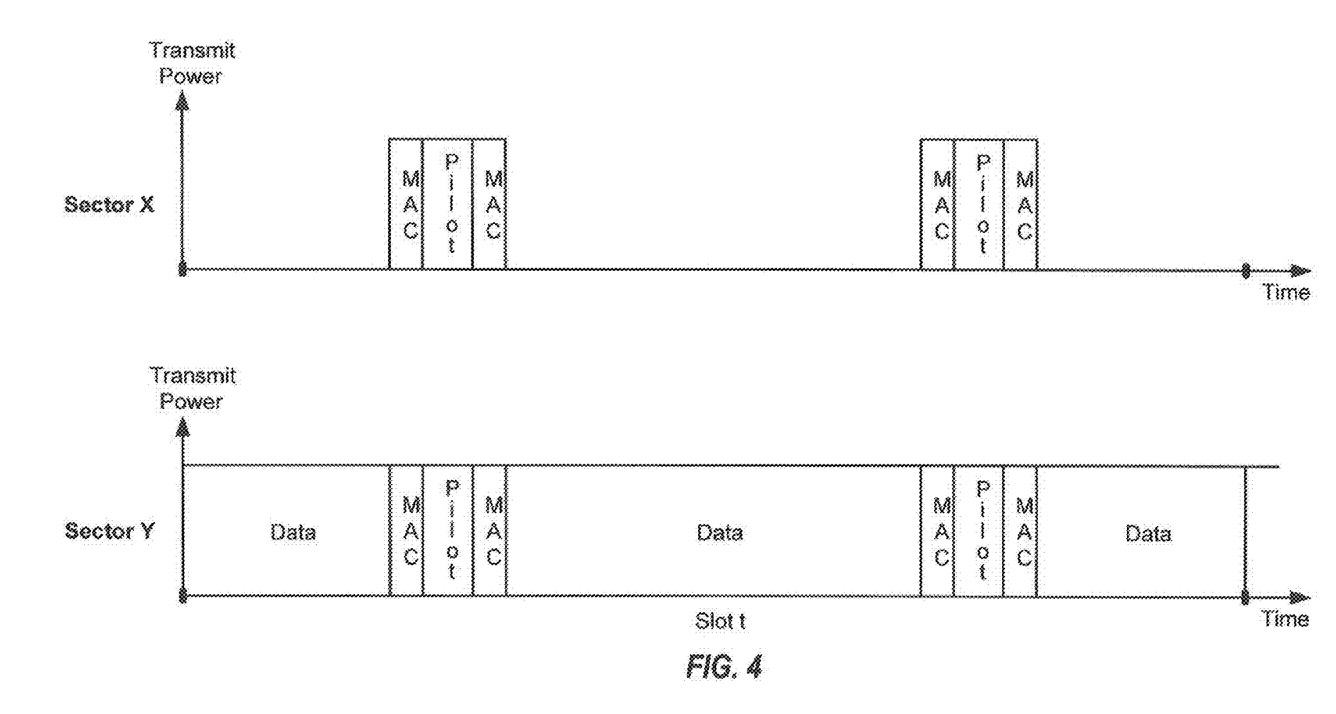
FIG. 4 shows transmission of pilot and overhead information by two sectors.

FIG. 4 shows exemplary transmission of pilot and overhead information by two sectors X and Y on one carrier in HRPD. The transmission timeline for each sector may be partitioned into slots, with each slot having a duration of 1.67 milliseconds (ms) and covering 2048 chips at 1.2288 Mcps in HRPD. Each slot is divided into two half-slots, and each half-slot includes a pilot burst. Two signaling bursts (denoted as "MAC" in FIG. 4) are transmitted on both sides of each pilot burst. Each pilot burst covers 96 chips, and each signaling burst covers 64 chips. Data may be transmitted in the remaining portion of each half-slot. All sectors have synchronized frame timing, and the pilot bursts and signaling bursts of all sectors are time aligned.

In the example shown in FIG. 4, sector Y transmits at $P_{MAX}$ in each slot. Sector X does not transmit in the data portion but transmits pilot and overhead information at $P_{MAX}$ in each slot. The data transmissions from sector Y thus observe no interference from sector X. However, the pilot and overhead transmissions from sector Y observe interference from sector X. Different amounts of interference on the data and pilot transmissions may adversely impact the performance of sector Y. For example, the terminals in sectors Y may estimate SINR based on the pilot from sector Y. The estimated SINR may be used to select a serving sector and to select a data rate for data transmission. The pilot from sector Y may observe high interference due to the pilot from sector X, and the SINR of the pilot may be poor and not indicative of the SINR of the data. Hence, the selection of the serving sector and the data rate may be suboptimal. This scenario may be avoided by having sector X turn off the carrier and not transmit the pilot and overhead information when its load is light.

In a second design of dynamic coverage adjustment, carrier k may be turned down, its transmit power may be reduced to a lower level, and its coverage may be reduced correspondingly when the load of sector X is light. The lower transmit power level may be sufficiently low to reduce interference to other sectors and to allow the coverage and SINR distribution of these sectors to improve. The lower transmit power level may still allow sector X to serve some terminals (e.g., those located closer to sector X) on carrier k.

In one design, a fixed lower transmit power level may be used by sector X when its load is light. In another design, the lower transmit power level may be configurable and may be dependent on the load of sector X. For example, the lower transmit power level may be proportional to the load of sector X.

In a third design of dynamic coverage adjustment, the transmit power on a given carrier k may be switched between on and off/down in a time-varying manner based on the load of sector X. Carrier k may thus be turned on some of the time and turned off/down some other time. Carrier k may be turned off by reducing the transmit power to zero or turned down by reducing the transmit power to a lower level.

Figure 5:
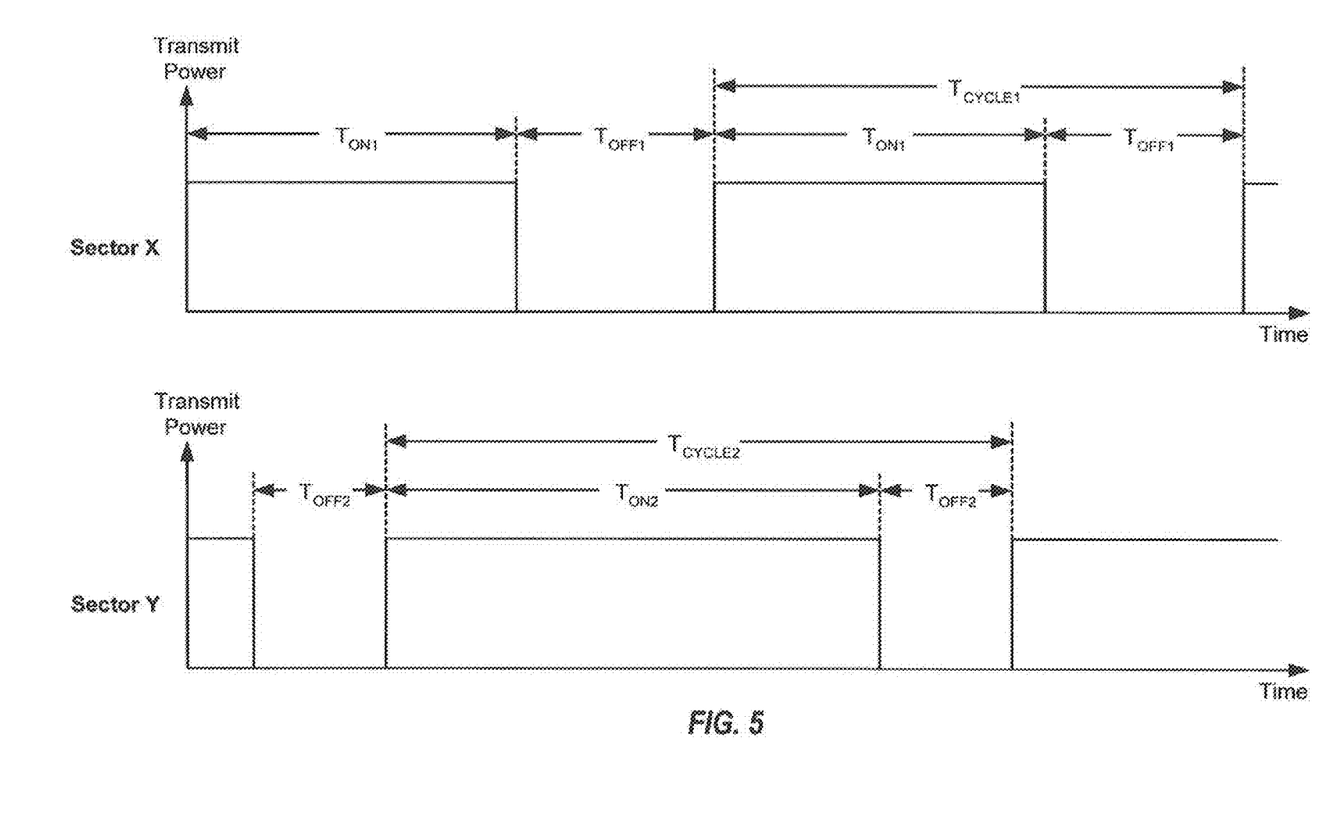
FIG. 5 shows a switching pattern to adjust transmit power for a carrier.

FIG. 5 shows a design of adjusting the transmit power of carrier k in a time-varying manner. In this design, sector X transmits on carrier k at $P_{MAX}$ for a duration of $T_{ON1}$, then turns off carrier k for a duration of $T_{OFF1}$, then transmits on carrier k at $P_{MAX}$ for a duration of $T_{ON1}$, then turns off carrier k for a duration of $T_{OFF1}$, etc. Sector Y transmits on carrier k at $P_{MAX}$ for a duration of $T_{OFF1}$, then turns off carrier k for a duration of $T_{OFF2}$, then transmits on carrier k at $P_{MAX}$ for a duration of $T_{ON2}$, then turns off carrier k for a duration of $T_{OFF2}$, etc.

For sector X, each cycle in which carrier k is turned on and off has a duration of $T_{CYCLE1}=T_{ON1}+T_{OFF1}$. For sector Y, each cycle in which carrier k is turned on and off has a duration of $T_{CYCLE2}=T_{ON2}+T_{OFF2}$. For each sector, the duty cycle of carrier k may be given as:

$$\text{Duty Cycle} = \frac{T_{ON}}{T_{ON} + T_{OFF}}.$$

Eq (1)

The average transmit power of each sector on carrier k is dependent on (e.g., is proportional to) the duty cycle. Each sector may reduce its average transmit power on carrier k by selecting a smaller duty cycle. Each sector may thus select the duty cycle based on the load of that sector.

In general, the cycle duration $T_{CYCLE}$ may be fixed or configurable for each sector. The cycles of different sectors may be aligned in time (not shown in FIG. 5) or may not be aligned in time (as shown in FIG. 5). The on duration $T_{ON}$ may be fixed or configurable for each sector. The on duration and the cycle duration may be sufficiently long to avoid rapidly switching carrier k between on and off/down. Although not shown in FIG. 5, a sector may slowly ramp down its transmit power when turning off/down carrier k and may slowly ramp up its transmit power when turning on carrier k. The slow ramp down and up may allow other sectors to account for changes in transmit power by the sector in similar manner as for fading.

In one design, a sector may use a fixed duty cycle of less than one (e.g., 0.5) when its load is light and may transmit all the time when its load is not light. In another design, a sector may use a configurable duty cycle, which may be selected based on (e.g., proportional to) the load of the sector. For example, the duty cycle may go from 1 to 0 as the sector load gets progressively lighter.

In one design, each sector can autonomously determine when to turn on and off/down carrier k. Each sector may turn on and off/down carrier k based on a switching pattern that indicates when to turn on carrier k and when to turn off/down carrier k. In another design, the sectors may communicate via the backhaul and may coordinate when and/or how long each sector should turn off/down carrier k. A sector may obtain the switching pattern of a neighbor sector and may then schedule its terminals accordingly, e.g., scheduled its terminals on carrier k when the neighbor sector turns off/down carrier k.

The switching pattern for each sector may be selected based on the load of the sector. A switching pattern may be periodic and may have a fixed on duration and a fixed off/down duration, e.g., as shown in FIG. 5. A switching pattern may also be aperiodic and may have a variable on duration and/or a variable off/down duration. In yet another design, a designated network entity (e.g., network controller 130 in FIG. 1) may receive reports from sectors indicating their load and may instruct each sector to turn its transmit power on or off/down on each carrier. The designated network entity may determine the on/off/down instructions for the sectors such that inter-sector interference can be reduced.

Switching carrier k on and off/down in a time-varying manner may result in the terminals in each sector observing better SINR some of the time when the neighbor sectors turn off/down carrier k. For opportunistic scheduling, a sector may schedule its coverage-edge terminals when the neighbor sectors turn off/down carrier k. For example, sector X may schedule its coverage-edge terminals during durations when sector Y turns off/down carrier k. Similarly, sector Y may schedule its coverage-edge terminals during durations when sector X turns off/down carrier k.

FIG. 5 shows a design in which both sectors X and Y turn on and off/down carrier k. In another design, sector X may turn on and off/down carrier k, and sector Y may turn on carrier k all the time.

Sector X may serve one or more terminals on carrier k and may decide to turn off/down carrier k, e.g., due to light load. Sector X may hand off each terminal operating on carrier k to (i) another carrier that is turned on by sector X or (ii) another sector operating on carrier k.

A terminal may be capable of operating on one or more carriers among K available carriers. A serving sector and a carrier may be selected for the terminal based on SINRs achieved by the terminal for all sectors that can potentially serve the terminal on the K carriers. For each potential serving sector, the terminal may estimate the SINR of that sector on each available carrier. The terminal may have different SINRs for different carriers of a given sector due to use of different transmit power levels on different carriers by different sectors.

In one design, the terminal may select a serving sector and a carrier based on the SINRs for all sectors on all carriers. The selected carrier of the selected sector may have the best SINR among the SINRs for all sectors and all carriers. The terminal may map the SINR of the selected sector on the selected carrier to a data rate, e.g., based on a look-up table. The terminal may send a message comprising the selected data rate (e.g., on a Data Rate Control (DRC) channel in HRPD) to the selected sector, which may schedule the terminal for data transmission on the selected carrier.

In another design, the terminal may have a serving sector and may send a pilot measurement report to the serving sector. The pilot measurement report may include channel quality indicator (CQI) information, which may comprise quantized versions of the SINRs for all sectors and carriers. The serving sector may select a carrier for the terminal based on the CQI information. Another serving sector may also be selected for the terminal based on the CQI information. In any case, the terminal may be scheduled for data transmission by the serving sector (or a new serving sector) on the selected carrier.

In one design, the terminal may have a set of potential serving sectors for each carrier, which may be referred to as an active set, a candidate set, a sector set, etc. For each carrier, a new sector may be added to the active set if the SINR for the sector on the carrier is sufficiently high, and an existing sector may be removed from the active set if the SINR for the sector on the carrier is sufficiently low. In one design, the terminal may maintain the active sets for all K carriers. In another design, the system may maintain the active sets for all K carriers for the terminal based on pilot measurement reports from the terminal. In any case, a serving sector and a carrier may be selected for the terminal from among the potential serving sectors in the active sets.

Figure 6:
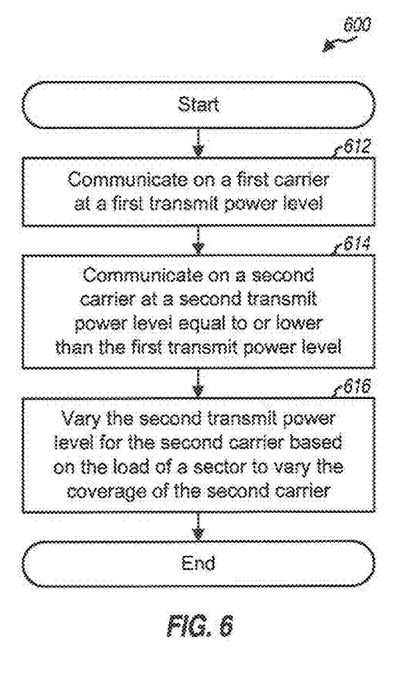
FIG. 6 shows a process for communication by a base station for a sector.

FIG. 6 shows a design of a process 600 for communicating in a wireless communication system. Process 600 may be performed by a base station for a sector (as described below) or by some other entity (e.g., a terminal). The base station may communicate on a first carrier at a first transmit power level (e.g., $P_{MAX}$), with the first carrier having a first coverage (block 612). The base station may communicate on a second carrier at a second transmit power level equal to or lower than the first transmit power level (block 614). The second carrier may have a second coverage equal to or smaller than the first coverage. The base station may vary the second transmit power level for the second carrier based on the load of the sector in order to vary the coverage of the second carrier (block 616).

The base station may also communicate on a third carrier at a third transmit power level equal to or lower than the first transmit power level. The third carrier may have a third coverage equal to or smaller than the first coverage. The base station may vary the third transmit power level for the third carrier based on the load of the sector in order to vary the coverage of the third carrier. In general, the base station may communicate on any number of carriers and may vary the transmit power of one or more carriers based on the load of the sector.

In one design, for block 612, the base station may send data transmissions to one or more terminals on the first carrier at the first transmit power level. For block 614, the base station may send data transmissions to one or more terminals on the second carrier at the second transmit power level. In another design, for block 612, the base station may receive data transmissions sent by one or more terminals on the first carrier at the first transmit power level. For block 614, the base station may receive data transmissions sent by one or more terminals on the second carrier at the second transmit power level. For both designs, the base station may serve different terminals on different carriers. The base station may also serve a given terminal on multiple carriers. In one design of block 616, the base station may reduce the second transmit power level to zero to turn off the second carrier if the load of the sector is light. In another design, the base station may reduce the second transmit power level to a low level below the first transmit power level if the load of the sector is light. For both designs, the base station may determine that the load of the sector is light if the number of active terminals in the sector is fewer than a predetermined number of terminals for a predetermined amount of time. The base station may also determine that the sector load is light based on some other criteria. In yet another design, the base station may vary the second transmit power level based on a function of the load of the sector. The second transmit power level may be progressively lower for progressively lighter sector load. The base station may determine the load of the sector based on the number of active terminals in the sector, historical information on the load of the sector, time of day, and/or other information.

In yet another design of block 616, the base station may vary the second transmit power level based on a switching pattern that indicates when to use high transmit power (e.g., $P_{MAX}$) and when to use low transmit power (e.g., $P_{LOW}$ or zero) on the second carrier, e.g., as shown in FIG. 5. The base station may determine the duty cycle of the switching pattern based on the load of the sector. The base station may also select the switching pattern based on the expected load of the sector (e.g., time of the day), etc.

In one design, opportunistic scheduling may be performed. The base station may determine a switching pattern of a neighbor sector in another base station. The base station may determine a quiet period when the neighbor sector will reduce its transmit power on the second carrier based on the switching pattern. The base station may identify a terminal observing high interference from the neighbor sector and may communicate with (e.g., schedule data transmission to) the terminal on the second carrier during the quiet period.

In one design, the base station may ramp up the second transmit power level for a transition from low transmit power to high transmit power. The base station may ramp down the second transmit power level for a transition from high transmit power to low transmit power. This ramp up and down may mitigate the adverse effects of changing transmit power to neighbor sectors.

In one design, the base station may autonomously vary the second transmit power level for the second carrier, without communicating with other network entities or other sectors regarding the second transmit power level. In another design, the base station may communicate with a network entity or a neighbor sector to determine the second transmit power level for the second carrier. The second transmit power level may be varied based further on the load of the neighbor sector. For example, the second transmit power level may be reduced if the sector has light load and/or the neighbor sector has heavy load.

Figure 7:
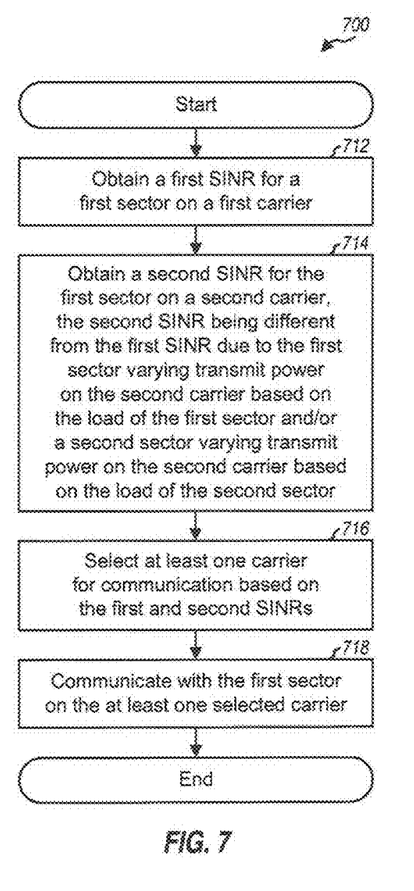
FIG. 7 shows a process for communication by a terminal.

FIG. 7 shows a design of a process 700 for communicating in a wireless communication system. Process 700 may be performed by a terminal (as described below) or by some other entity. The terminal may obtain a first SINR for a first sector on a first carrier (block 712). The terminal may obtain a second SINR for the first sector on a second carrier (block 714). The second SINR may be different from the first SINR due to (i) the first sector varying its transmit power on the second carrier based on the load of the first sector and/or (ii) a second sector varying its transmit power on the second carrier based on the load of the second sector. The terminal may select at least one carrier for communication based on the first and second SINRs (block 716). More than two carriers may be available. In this case, the terminal may obtain an SINR for each carrier and may select at least one carrier (e.g., the carrier with the highest SINR) for communication. In any case, the terminal may communicate with the first sector on the at least one selected carrier (block 718).

For block 716, the second SINR may be higher than the first SINR, e.g., due to the second sector reducing its transmit power on the second carrier in response to light load at the second sector. The terminal may then select the second carrier due to the second SINR being higher than the first SINR. Alternatively, the first SINR may be higher than the second SINR, e.g., due to the first sector reducing its transmit power on the second carrier in response to light load at the first sector. The terminal may then select the first carrier due to the first SINR being higher than the second SINR. The terminal may also select the first and second carriers. In any case, data transmissions may be sent on the first and/or second carriers at first and second data rates, respectively, which may be determined based on the first and second SINRs, respectively.

In one design, the terminal may select a data rate based on the SINR for each selected carrier. The terminal may send a message comprising the at least one selected carrier and the data rate for each selected carrier to the first sector. For block 718, the terminal may receive a data transmission sent by the first sector at the selected data rate (or a lower data rate) on each selected carrier.

In general, any number of carriers may be available. The terminal may be a multi-carrier terminal that can operate on multiple carriers simultaneously. The terminal may determine the SINR for the first sector on each carrier. If the SINR for the first sector on a given carrier k is low (e.g., below a certain threshold), then the terminal may have several options. First, the terminal may select another sector with a higher SINR on carrier k. Second, the terminal may not be served on carrier k if there are no other sectors on carrier k whose SINR is sufficiently high. For example, if the first sector reduces its transmit power to zero or a low level on carrier k (e.g., because of light load), then the terminal may not be served on carrier k anymore but may continue to be served on the remaining carriers.

In one design, the terminal may determine a first set of potential serving sectors for the first carrier. The terminal may also determine a second set of potential serving sectors for the second carrier. The first set may be different from the second set, e.g., due to one or more sectors varying their transmit power on the first or second carrier based on the load of the sectors. The terminal may update the first and second sets based on SINR measurements. Alternatively, the terminal may report the SINR measurements to the system and may be provided with the first and second sets. In any case, the terminal may select a serving sector and a carrier based on the first and second sets.

Figure 8:
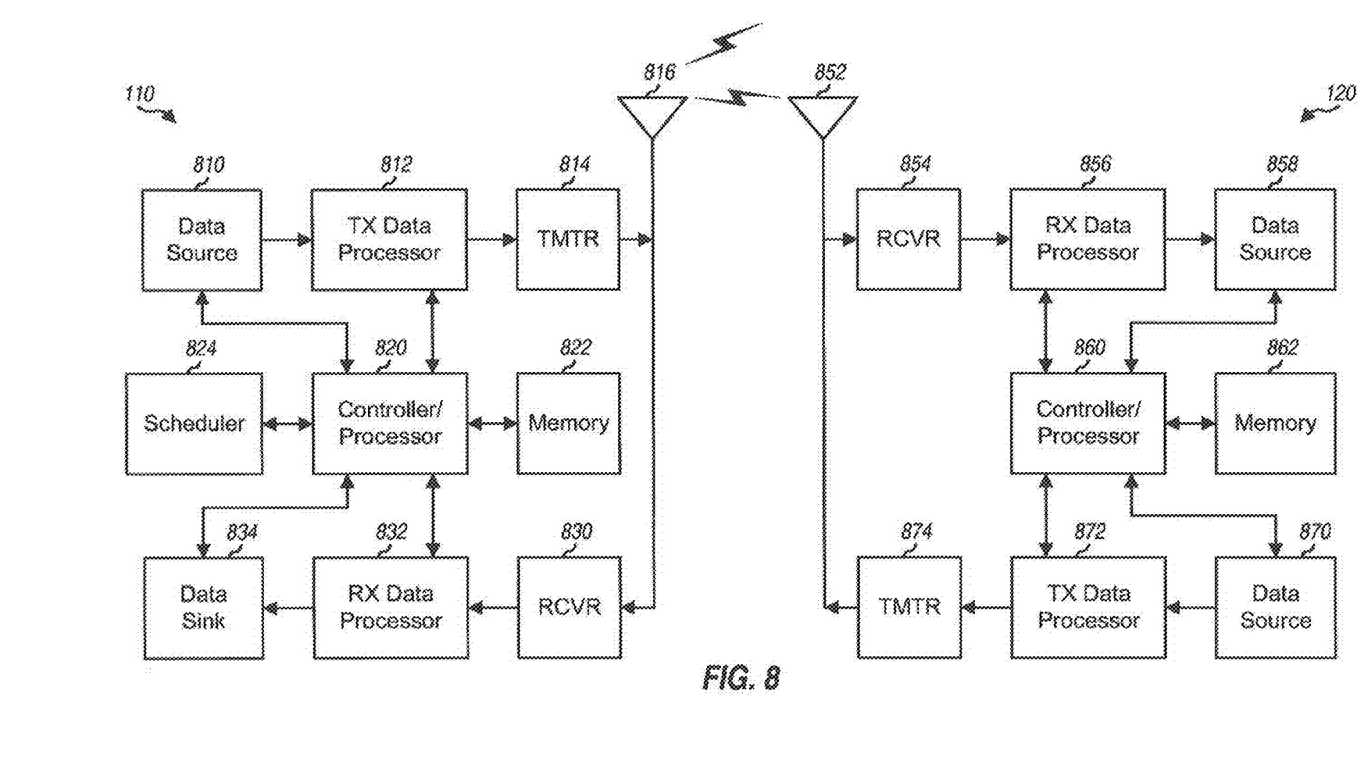
FIG. 8 shows a block diagram of a base station and a terminal.

FIG. 8 shows a block diagram of a design of a base station 110 and a terminal 120, which may be one of the base stations and one of the terminals in FIG. 1. At base station 110, a transmit (TX) data processor 812 may receive data from a data source 810 for terminals scheduled for data transmission and overhead information from a controller/processor 820. TX data processor 812 may process (e.g., encode, interleave, modulate) the data for each terminal based on a data rate selected for that terminal and obtain data symbols for all terminals. TX data processor 812 may also process the overhead information and obtain overhead symbols. TX data processor 812 may further process the data symbol, overhead symbols, and pilot symbols (e.g., for CDMA, OFDMA, etc.) and generate output samples. A transmitter (TMTR) 814 may process (e.g., convert to analog, amplify, filter, and frequency upconvert) the output samples and generate a forward link signal, which may be transmitted via an antenna 816 to terminals.

At terminal 120, an antenna 852 may receive forward link signals from base station 110 and/or other base stations. A receiver (RCVR) 854 may process a received signal from antenna 852 and provide input samples. A receive (RX) data processor 856 may process the input samples (e.g., for CDMA, OFDMA, etc.) to obtain received symbols. RX data processor 856 may further process (e.g., demodulate, deinterleave, and decode) the received symbols, provide decoded data for terminal 120 to a data sink 858, and provide decoded overhead information to a controller/processor 860.

At terminal 110, a TX data processor 872 may receive data from a data source 870 and control information (e.g., a data rate request, CQI information, etc.) from controller/processor 860. TX data processor 872 may process the data and control information and generate output samples. A transmitter 874 may process the output samples and generate a reverse link signal, which may be transmitted via antenna 852 to base station 110.

At base station 110, antenna 816 may receive reverse link signals from terminal 120 and/or other terminal. A receiver 830 may process a received signal from antenna 816 and provide input samples. An RX data processor 832 may process the input samples, provide decoded data for each terminal to a data sink 834, and provide decoded control information to controller/processor 820.

Controllers/processors 820 and 860 may direct the operation at base station 110 and terminal 120, respectively. Controller/processor 820 and/or other modules at base station 110 may perform or direct process 600 in FIG. 6 and/or other processes for the techniques described herein. Controller/processor 860 and/or other modules at terminal 120 may perform or direct process 600 in FIG. 6, process 700 in FIG. 7, and/or other processes for the techniques described herein. Memories 822 and 862 may store program codes and data for base station 110 and terminal 120, respectively. Scheduler 824 may schedule terminals for data transmission on the forward and/or reverse link. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication comprising:
   communicating on a first carrier in a sector at a first transmit power level;
   communicating on a second carrier in the sector at a second transmit power level equal to or lower than the first transmit power level; and
   varying, by lowering the second transmit power level for the second
      carrier based on load of the sector and independent of the first transmit power level of the first carrier.

2. The method of claim 1, wherein the varying the second transmit power level comprises:
   determining whether the load of the sector is light, and
   reducing the second transmit power level to zero or a low level below the first transmit power level if the load of the sector is light.

3. The method of claim 2, wherein the determining whether the load of the sector is light comprises determining that the load of the sector is light if the number of active terminals in the sector is fewer than a predetermined number of terminals for a predetermined amount of time.

4. The method of claim 2, wherein the reducing the second transmit power level comprises reducing the second transmit power level to zero to turn of the second carrier if the load of the sector is light.

5. The method of claim 1, wherein the varying the second transmit power level comprises varying the second transmit power level based on a function of the load of the sector, the second transmit power level being progressively lower for progressively lighter load.

6. The method of claim 1, wherein the varying the second transmit power level comprises varying the second transmit power level based on a switching pattern indicating when to use high transmit power and when to use low transmit power on the second carrier.

7. The method of claim 6, further comprising:
   determining a duty cycle of the switching pattern based on the load of the sector.

8. The method of claim 6, further comprising:
   selecting the switching pattern based on expected load of the sector.

9. The method of claim 1, further comprising:
   determining the load of the sector based on at least one of the number of active terminals in the sector, historical information on the loan of the sector, and time of day.

10. The method of claim 1, further comprising:
determining a switching pattern of a neighbor sector;
determining a quiet period when the neighbor sector will reduce transmit power on the second carrier based on the switching pattern;
identifying a terminal observing high interference from the neighbor sector; and
communicating with the terminal on the second carrier during the quiet period.

11. The method of claim 1, wherein the varying the second transmit power level comprises autonomously varying the second transmit power level for the second carrier by the sector, without communicating with other network entities or other sectors regarding the second transmit power level.

12. The method of claim 1, wherein the varying the second transmit power level comprises communicating by the sector with a network entity or a neighbor sector to determine the second transmit power level for the second carrier, the second transmit power level being varied based further on load of the neighbor sector.

13. The method of claim 1, further comprising:
communicating on a third carrier at a third transmit power level equal to or lower than the first transmit power level; and
varying the third transmit power level for the third carrier based on the load of the sector.

14. An apparatus for wireless communication, comprising:
means for communicating on a first carrier in a sector at a first transmit power level;
means for communicating on a second carrier in the sector at a second transmit power level equal to or lower than the first transmit power level; and
means for varying, by lowering the second transmit power level for the second carrier based on load of the sector and independent of the first transmit power level of the first carrier.

15. The apparatus of claim 14, wherein the means for varying the second transmit power level comprises;
means for determining whether the load of the sector is light, and
means for reducing the second transmit power level to zero or a low level below the first transmit power level if the load of the sector is light.

16. The apparatus of claim 14, wherein the means for varying the second transmit power level comprises means for varying the second transmit power level based on a function of the load of the sector, the second transmit power level being progressively lower for progressively lighter load.

17. The apparatus of claim 14, wherein the means for varying the second transmit power level comprises:
means for varying the second transmit power level based on a switching pattern indicating when to use high transmit power and when to use low transmit power on the second carrier, and
means for determining a duty cycle of the switching pattern based on the load of the sector.

18. The apparatus of claim 14, further comprising:
means for determining a switching pattern of a neighbor sector;
means for determining a quiet period when the neighbor sector will reduce transmit power on the second carrier based on the switching pattern;
means for identifying a terminal observing high interference from the neighbor sector; and
means for communicating with the terminal on the second carrier during the quiet period.

19. An apparatus for wireless communication, comprising:
at least one processor configured to communicate on a first carrier in a sector at a first transmit power level, to communicate on a second carrier in the sector at a second transmit power level equal to or lower than the first transmit power level, and to vary, by lowering the second transmit power level for the second carrier based on load of the sector and independent of the first transmit power level of the first carrier.

20. The apparatus of claim 19, wherein the at least one processor is configured to determine whether the load of the sector is light, and to reduce the second transmit power level to zero or a low level below the first transmit power level if the load of the sector is light.

21. The apparatus of claim 19, wherein the at least one processor is configured to vary the second transmit power level based on a function of the load of the sector, the second transmit power level being progressively lower for progressively lighter load.

22. The apparatus of claim 19, wherein the at least one processor is configured to vary the second transmit power level based on a switching pattern indicating when to use high transmit power and when to use low transmit power on the second carrier, and to determine a duty cycle of the switching pattern based on the load of the sector.

23. The apparatus of claim 19, wherein the at least one processor is configured to determine a switching pattern of a neighbor sector, to determine a quiet period when the neighbor sector will reduce transmit power on the second carrier based on the switching pattern, to identify a terminal observing high interference from the neighbor sector, and to communicate with the terminal on the second carrier during the quiet period.

24. A computer program product, comprising:
a non-transitory computer-readable medium comprising:
code for causing at least one computer to communicate on a first carrier in a sector at a first transmit power level,
code for causing the at least one computer to communicate on a second carrier in the sector at a second transmit power level equal to or lower than the first transmit power level, and
code for causing the at least one computer to vary, by lowering the second transmit power level for the second carrier based on load of the sector and independent of the first transmit power level of the first carrier.

25. A method for wireless communication, comprising:
obtaining a first signal-to-noise-and-interference ratio (SINR) for a first sector on a first carrier;
obtaining a second SINR for the first sector on a second carrier in the first sector, the second SINR being different from the first SINR due to the first sector varying, by lowering transmit power on the second carrier based on load of the first sector and independent of a transmit power level of the first carrier;
selecting at least one carrier for the communication based on the first and second SINRs; and communicating with the first sector on the at least one selected carrier.

26. The method of claim 25, wherein the second SINR is higher than the first SINR due to a second sector reducing transmit power on the second carrier in response to light load at the second sector, and wherein the second carrier is selected due to the second SINR being higher than the first SINR.

27. The method of claim 25, wherein the first SINR is higher than the second SINR due to the first sector reducing transmit power on the second carrier in response to light load at the first sector, and wherein the first carrier is selected due to the first SINR being higher than the second SINR.

28. The method of claim 25, wherein the first and second carriers are selected, and wherein data transmissions are sent on the first and second carriers at first and second data rates determined based on the first and second SINRs, respectively.

29. The method of claim 25, further comprising:
selecting a data rate based on an SINR for each of the at least one selected carrier; and
sending a message comprising the at least one selected carrier and the data rate for each selected carrier to the first sector.

30. The method of claim 25, further comprising:
determining a first set of potential serving sectors for the first carrier; and
determining a second set of potential serving sectors for the second carrier, the first set being different from the second set.

31. An apparatus for wireless communication, comprising:
means for obtaining a first signal-to-noise-and-interference ratio (SINR) for a first sector on a first carrier;
means for obtaining a second SINR for the first sector on a second carrier in the first sector, the second SINR being different from the first SINR due to the first sector varying, by lowering transmit power on the second carrier based on load of the first sector and independent of a transmit power level of the first carrier;
means for selecting at least one carrier for the communication based on the first and second SINRs; and
means for communicating with the first sector on the at least one selected carrier.

32. The apparatus of claim 31, wherein the second SINR is higher than the first SINR due to a second sector reducing transmit power on the second carrier in response to light load at the second sector, and wherein the second carrier is selected due to the second SINR being higher than the first SINR.

33. The apparatus of claim 31, wherein the first SINR is higher than the second SINR due to the first sector reducing transmit power on the second carrier in response to light load at the first sector, and wherein the first carrier is selected due to the first SINR being higher than the second SINR.

34. The apparatus of claim 31, further comprising:
means for determining a first set of potential serving sectors for the first carrier; and
means for determining a second set of potential serving sectors for the second carrier, the first set being different from the second set.

* * * * *